United States Patent
Seo

(10) Patent No.: US 6,739,237 B2
(45) Date of Patent: May 25, 2004

(54) CONNECTING ROD APPARATUS OF HERMETIC COMPRESSOR

(75) Inventor: Seung-don Seo, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 98 days.

(21) Appl. No.: 10/090,203

(22) Filed: Mar. 4, 2002

(65) Prior Publication Data

US 2003/0079604 A1 May 1, 2003

(30) Foreign Application Priority Data

Oct. 25, 2001 (KR) ........................................ 2001-65933

(51) Int. Cl.[7] ................................................. F01B 9/00
(52) U.S. Cl. ........................ 92/128; 417/415; 74/579 E
(58) Field of Search ................... 92/128, 140; 417/415; 74/579 E

(56) References Cited

U.S. PATENT DOCUMENTS

| | | | | |
|---|---|---|---|---|
| 4,178,140 A | * | 12/1979 | Tankred | ........................ 92/129 |
| 4,236,874 A | * | 12/1980 | Sisk | ........................... 417/315 |
| 4,407,168 A | * | 10/1983 | Andrione et al. | ......... 74/579 E |
| 4,905,540 A | * | 3/1990 | Hughes et al. | ............ 74/579 E |
| 5,785,029 A | * | 7/1998 | Fischer | .................... 123/197.3 |
| 5,799,565 A | * | 9/1998 | Bo | .............................. 92/128 |

* cited by examiner

Primary Examiner—Edward K. Look
Assistant Examiner—Igor Kershteyn
(74) Attorney, Agent, or Firm—Westman, Champlin & Kelly, P.A.

(57) ABSTRACT

A connecting rod apparatus of a compressor for converting a rotation to a reciprocal sliding by connecting an eccentric portion of a crank shaft and a piston. The connecting rod apparatus has: a bush rotatably connected with the eccentric portion, and having a first connecting portion with a pair of sloping sides at an outer circumference, the sloping sides have a predetermined slope in regard to an axis of the eccentric portion; a connecting rod having a small inner diameter for being connected with a piston pin connected with the piston, the small inner diameter is formed at one end of the connecting rod, and a second connecting portion for being connected with the first connecting portion in a direction of the axis along the sloping sides.

7 Claims, 4 Drawing Sheets

CONNECTING ROD APPARATUS OF HERMETIC COMPRESSOR

The present application is based on and claims the benefit of Korean patent application Serial Nos. 2001-65933, filed Oct. 25, 2001, the contents of which are hereby incorporated by reference in their entirety.

BACKGROUND OF THE INVENTION

1. Field of the Invention

The present invention relates to a reciprocal hermetic compressor, and more particularly, to a connecting rod apparatus for connecting a crank shaft and a piston in a reciprocal hermetic compressor.

2. Description of the Related Art

Generally, as shown in FIG. 1, a hermetic compressor comprises: a motor 1 having a stator 2 and a rotor 4 rotatably disposed around the stator 2; a crank shaft 6; a connecting rod 8; and a piston 10. The crank shaft 6 is integrally rotated being connected with the rotor 4, and has an eccentric portion 6a at a lower part. A portion of great diameter 8a disposed at one end of the connecting rod 8 is connected with the eccentric portion 6a. A portion of small diameter 8b disposed at another end of the connecting rod 8 is connected with the piston 10. The piston 10 moves lineally in a piston chamber 12a in a cylinder 12. Referring to FIG. 2, the portion of great diameter 8a has a great inner diameter h1 connected with the eccentric portion 6a, and the portion of small diameter 8b has a small inner diameter h2 connected with a piston pin 11. The great inner diameter h1 and the small inner diameter h2 are connected by an oil transferring path 8c.

In the above structure, the crank shaft 6 is rotated as the rotor 4 is driven, and allows the eccentric portion 6a to be rotated. The connecting rod 8 converts an eccentric rotation of the eccentric portion 6a to a lineal movement and reciprocally moves the piston 10. In other words, the reciprocal hermetic compressor is constructed to convert the rotation of the motor 1 to the lineal movement of the piston 10.

In the meantime, for the hermetic compressor having the above construction, an axis of the crank shaft 6 forms 90° when crossing with the connecting rod 8. The angle of 90° is known as a very important element in designing. Therefore, a geometric tolerance is generally written in related elements.

In addition, the piston 10 slides keeping an appropriate clearance in the piston chamber 12a in the cylinder 12. Yet, a parallel degree and a symmetry degree of the piston 10 should be regularly maintained centering the axis of the crank shaft 6.

Furthermore, the piston 10 should form a right angle with the piston pin 11. In the case of the connecting rod, the parallel degree and the symmetry degree between the great inner diameter h1 and the small inner diameter h2 are also important elements.

As described so far, various machinery connecting relations based on the connecting rod 8, in other words, an array of the connecting rod 8 with respect to the axis of the crank shaft 6 is an element affecting the driving capability of the compressor. Accordingly, when the array of the connecting rod 8 with respect to the axis of the crank shaft 6 is misarranged or instable, friction and abrasion between the elements are heavily generated. Therefore, the compressor might not be able to operate normally. Especially, when the crank shaft 6 and the piston 10 is not mechanically arrayed, the problem could be more aggravated.

Thus, there is a need to improve the reliability of the compressor by compensating for errors of the connecting rod apparatus that converts the rotation of the crank shaft 6 to the sliding.

SUMMARY OF THE INVENTION

The object of the present invention is to provide a connecting rod apparatus of a reciprocal hermetic compressor having an improved structure to compensate for the misalignment of a crank shaft and a piston.

The above object is accomplished by providing a connecting rod apparatus of a compressor for converting a rotation to a reciprocal sliding by connecting an eccentric portion of a crank shaft and a piston. The connecting rod apparatus comprises: a bush rotatably connected with the eccentric portion, and having a first connecting portion with a pair of sloping sides at an outer circumference, the sloping sides have a predetermined slope in regard to an axis of the eccentric portion; a connecting rod having a small inner diameter for being connected with a piston pin connected with the piston, the small inner diameter is formed at one end of the connecting rod, and a second connecting portion for being connected with the first connecting portion in a direction of the axis along the sloping sides, the second connecting portion is formed at another end of the connecting rod; and a connecting member for connecting the second connecting portion and the bush to be able to move by an external power.

It is preferable that the bush comprises: a cylindric body having a great inner diameter connected with the eccentric portion and the first connecting portion at an outer circumference; and a protrusion protruded corresponding to the first connecting portion at the outer circumference of the body and clamped by the connecting member.

Moreover, the second connecting portion includes: a pair of diverged portions diverged from one end of the body of the connecting rod in order to wrap the first connecting portion, and the pair of diverged portions have sloping sides corresponding to the sloping sides of the first connecting portion; and a supporting portion extended from a part between the diverged portion and the body by a predetermined thickness in order to prevent the connecting member from being separated by clamping both ends of the connecting member.

In addition, the second connecting portion is diverged from on end of the body of the connecting rod taking a shape of 'U'.

Furthermore, the sloping sides have an angle of 3° to 5° with respect to the axis of the eccentric portion.

Moreover, the connecting member is a piano string having a predetermined thickness in order to combine the connecting portion and the bush.

Additionally, the connecting member comprises: a clamping portion bent for a predetermined type in order to clamp the protrusion of the bush in a middle part; a plurality of supporting portions extended symmetrically from the clamping portion in order to wrap and support the outer circumference of the bush; and an end portion extended being bent from the supporting portions in order to wrap and clamp the second connecting portion of the connecting rod. The bush is prevented from being separated from the connecting portion by being supported by the piano string and can move by an elasticity of the piano string.

BRIEF DESCRIPTION OF THE DRAWINGS

The object and the feature of the present invention will be more apparent by describing the preferred embodiment of the present invention by referring to the appended drawings, in which.

DETAILED DESCRIPTION OF THE PREFERRED EMBODIMENT

Hereinbelow, the preferred embodiment of the present invention will be described in great detail by referring to the appended drawings.

Figure 1:
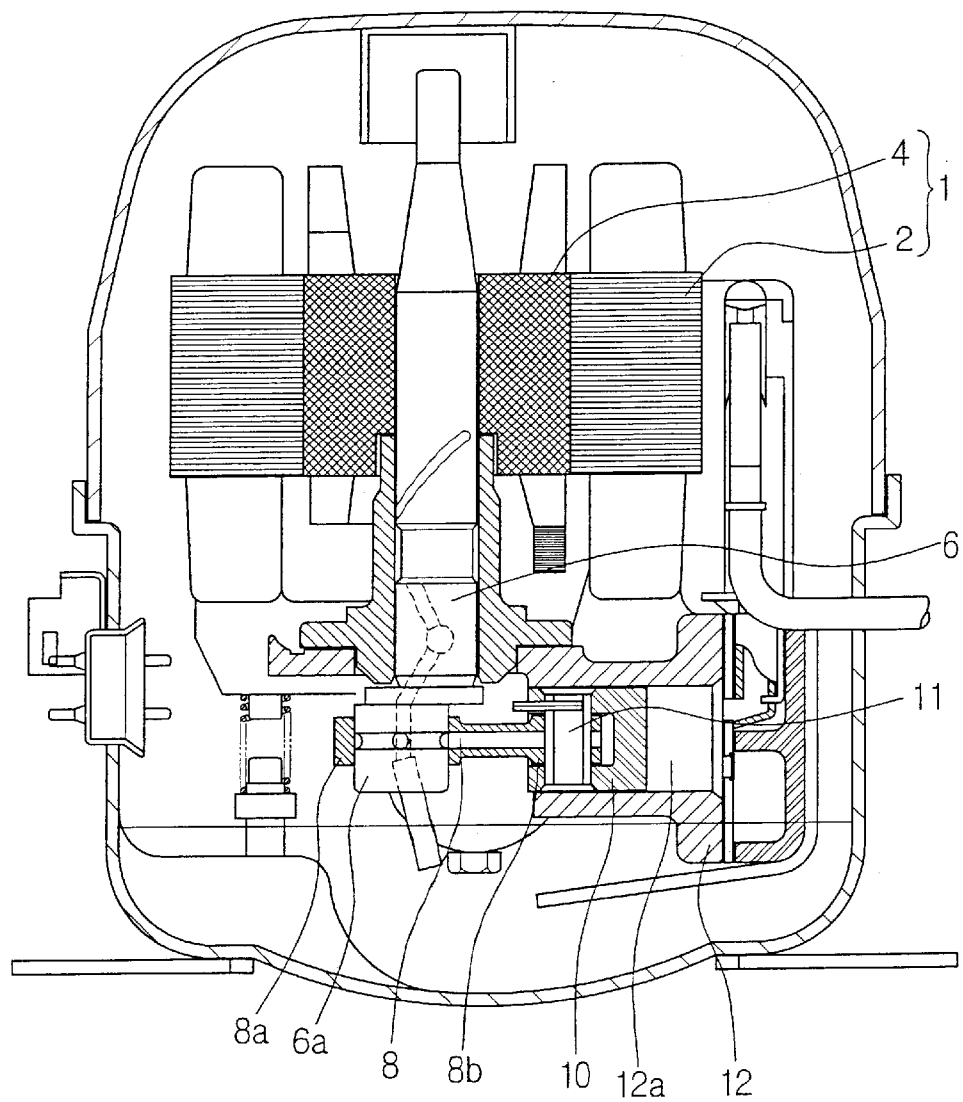
FIG. 1 is a partial sectional view schematically showing a conventional reciprocal hermetic compressor.
Figure 2:
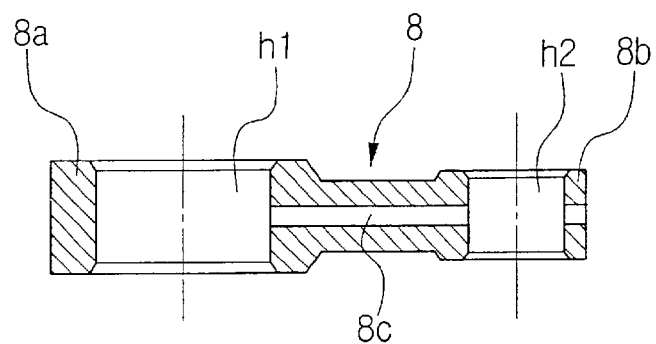
FIG. 2 is a sectional view showing a connecting rod shown in FIG. 1.
Figure 3:
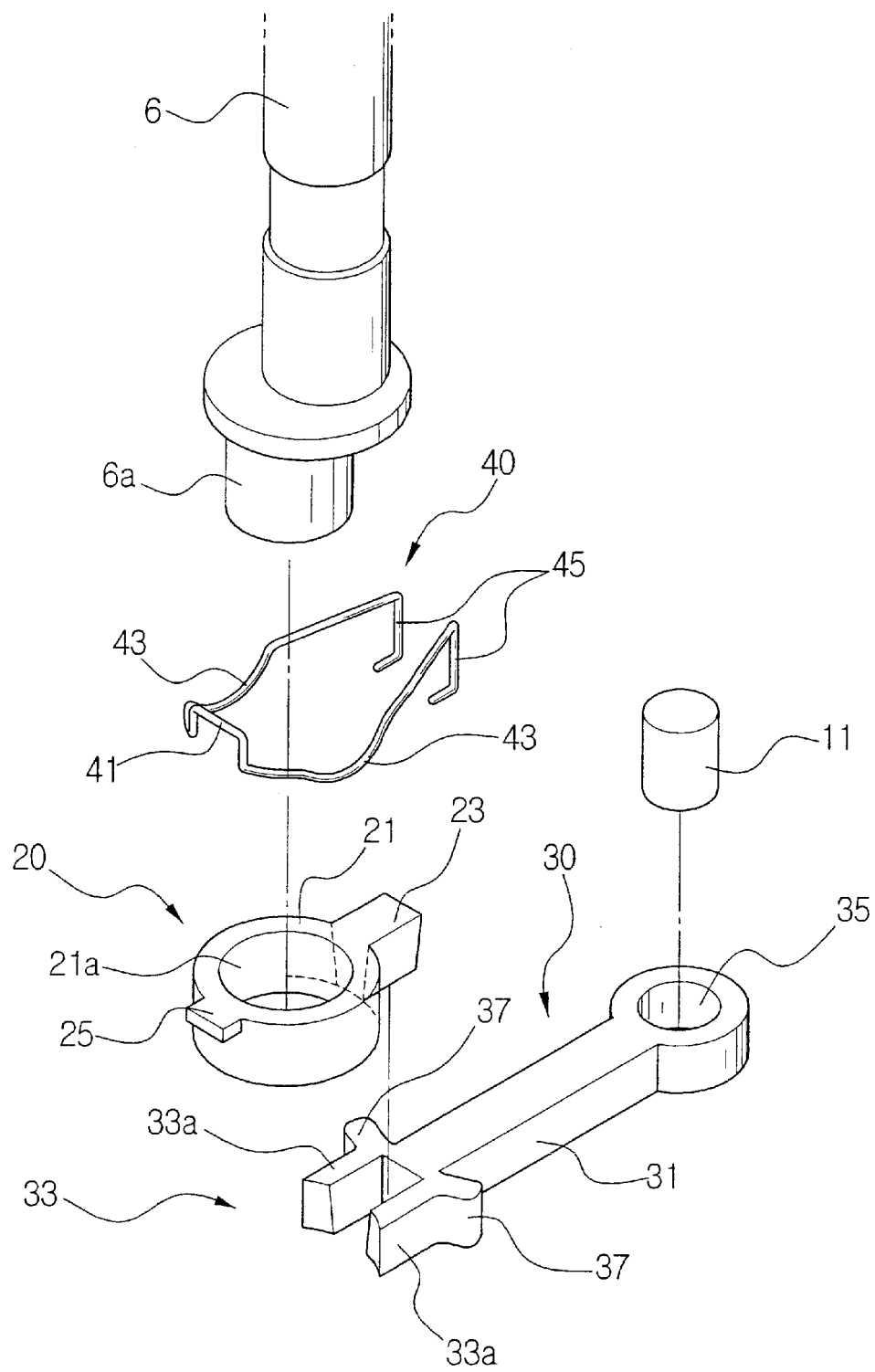
FIG. 3 is an exploded perspective view schematically showing a reciprocal hermetic compressor according to the present invention.

Referring to FIG. 3, a connecting rod apparatus of a reciprocal hermetic compressor according to the preferred embodiment of the present invention has a bush 20, a connecting rod 30, and a connecting member 40.

The bush 20 is rotatably connected with an eccentric portion 6a of a crank shaft 6. The bush 20 includes a body 21 having a great inner diameter 21a connected with the eccentric portion 6a, a first connecting portion 23, and a protrusion 25. Both of the first connecting portion 23 and the protrusion 25 are protruded at an outer circumference of the body 21. The body 21 is a cylindric type. The eccentric portion 6a of the crank shaft 6 is connected with the great inner diameter 21a of the body 21.

Figure 4:
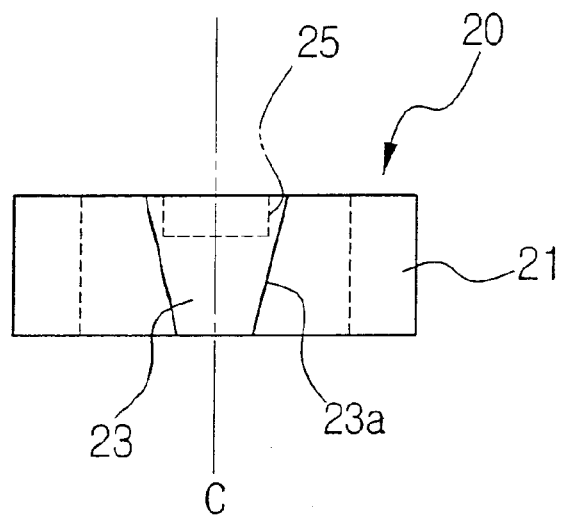
FIG. 4 is a front view showing a bush shown in FIG. 3.

The first connecting portion 23 includes a pair of sloping sides 23a having a predetermined slope in regard to an axis of the eccentric portion 6a. In other words, as shown in FIG. 4, both sides of the first connecting portion 23 have a predetermined slope with respect to the axis. It is preferable that the sloping degree is 3° to 5°. Therefore, a width of the first connecting portion 23 becomes narrower as it goes down.

The protrusion 25 is protruded at the outer circumference of the body 21 corresponding to the first connecting portion 23.

Figure 5:
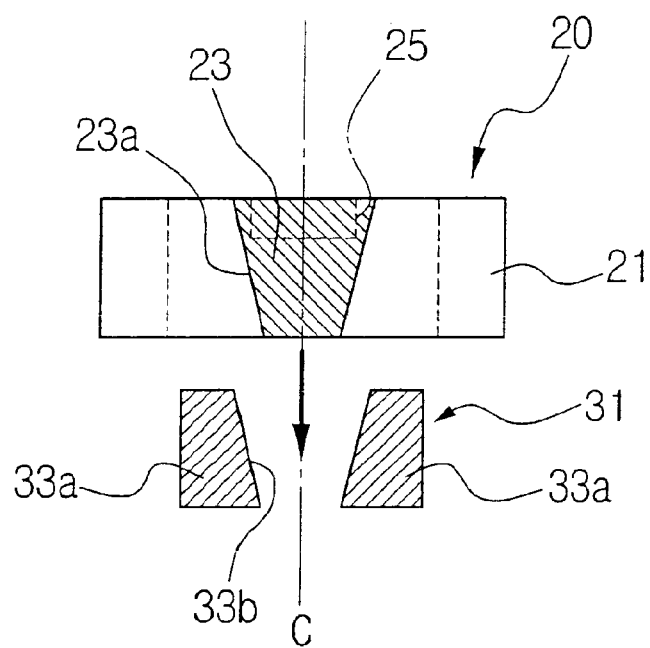
FIG. 5 is a sectional view showing a connection status of a connecting portion of the connecting rod and the bush shown in FIG. 3.

The connecting rod 30 has a body 31, and a second connecting portion 33 extended from one end of the body 31 in order to be connected with the first connecting portion 23 of the bush 20. A small inner diameter 35 connected with a piston pin 11 is formed at the other end of the connecting rod 30. The second connecting portion 33 is connected with the first connecting portion 23 of the bush 20 by being slid in a direction of the axis. For this end, the second connecting portion 33 has a pair of diverged portions 33a having a shape of 'U' in order to wrap the first connecting portion 23 at one end of the body 31. Moreover, a pair of sloping sides 33b corresponding to the pair of sloping sides 23a of the first connecting portion 23 are formed at an inside facing to each of the diverged portions 33a. The sloping sides 33b also have a sloping degree of 3° to 5° in regard to the axis. An interval of the diverged portions 33a becomes narrower as they go down corresponding to the width of the first connecting portion 23 by the sloping sides 33b as shown in FIG. 5. Accordingly, the first connecting portion 23 is connected with the second connecting portion 33 by being moved and slid from an upper part to a lower part. There is a gap between the sloping sides 23a and 33b when the first connecting portions 23 and 33 are connected first. Yet, as the first connecting portion 23 goes down further, the gap becomes narrower. Then, the first connecting portion 23 is completely fixed between the diverged portions 33a, thus the sloping sides 23a and 33b are connected with each other being adhered. Therefore, an angle of the connecting rod 30 in respect to the axis can be regularly maintained. Additionally, the first connecting portion 23 is prevented from being separated in a lower direction of the second connecting portion 33.

On the other hand, the connecting rod 30 has a pair of supporting portions 37 extended in both directions from a part between the second connecting portion 33 and the body 31. The supporting portions 37 are locked with the both ends of the connecting member 40.

Figure 6:
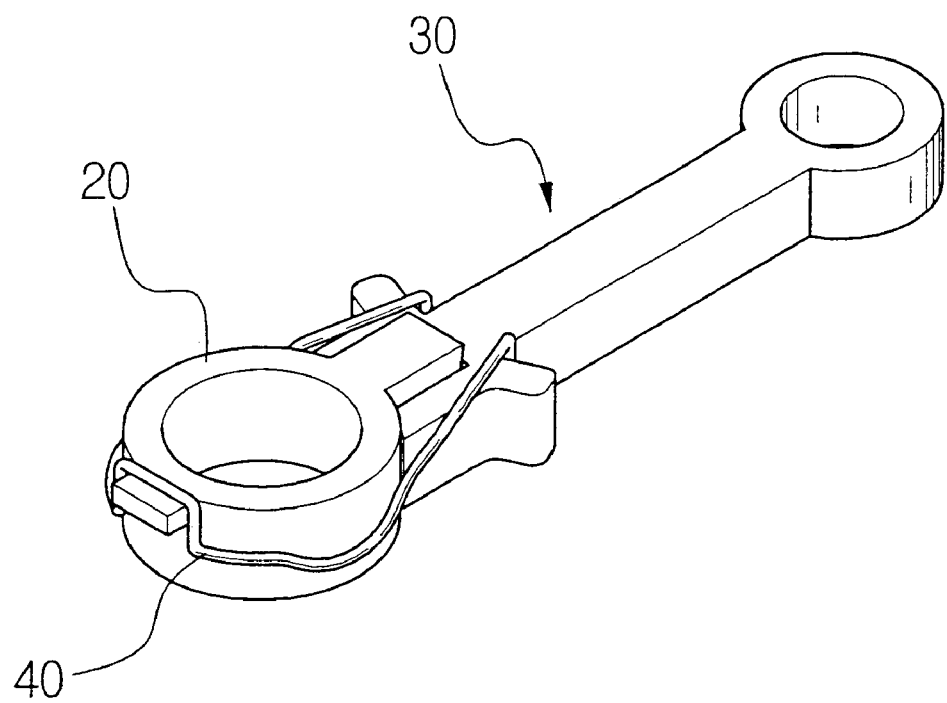
FIG. 6 is a compound perspective view showing the connecting rod shown in FIG. 3.

On the other hand, it is preferable that the connecting member 40 is a piano string formed as a predetermined type to have a predetermined intensity. The piano string has a diameter less than 1.5 mm. The connecting member 40 has a clamping portion 41 bent for a predetermined type to clamp the protrusion 25 of the bush 20, a plurality of supporting portions 43 extended from the clamping portion 41 being symmetrically in order to wrap and support an outer circumference of the body 21 of the bush 20, and a pair of end portions 45 extended and bent from the supporting portions 43 in order to wrap and clamp the supporting portions 37. In other words, as shown in FIG. 6, the clamping portion 41 of the connecting member 40 clamps the protrusion 25 by supporting from the upper part to the lower part. The support portions 43 support the outer circumference of the body 21. The end portions 45 are settled by clamping the supporting portions 37 as if the end portions 45 wrap the supporting portions 37. As described so far, the connecting member 40 connects the bush 20 and the connecting rod 30, thus the bush 20 can be prevented from being separated from the second connecting portion 33 in the direction of the axis and a direction of a piston perpendicular to the direction of the axis.

In the connecting rod apparatus of the hermetic compressor according to the preferred embodiment of the present invention having the above structure, the first connecting portion 23 and the second connecting portion 33 are connected being slid up and down in the status that the first connecting portion 23 and the second connecting portion 33 are arrayed up and down. There is a gap between the sloping sides 23a of the first connecting portion 23 and the sloping sides 33b of the second connecting portion 33 at first. However, as the first connecting portion 23 and the second connecting portion 33 are further connected, the gap disappears because the sloping sides 23a and the sloping side 33b are adhered to each other.

In addition, in the above status, as shown in FIG. 5, the bush 20 and the second connecting portion 33 are connected by using the connecting member 40. Then, the bush 20 is supported by the connecting member 40 and prevented from being separated in the upper direction. The bush 20 is not also separated in the lower direction since the sloping sides 23a are adhered to the sloping sides 33b. Furthermore, the connecting member 40 is the piano string having the predetermined intensity. Therefore, although the eccentric portion 6a of the crank shaft 6 and the axis of the piston is misaligned, the angle generated as the connecting member 40 tenses can be compensated.

Furthermore, as the sloping sides 23a and the sloping sides 33b are closely connected, the friction and the abrasion between the connecting rod 30 and the bush 20 can be reduced when the piston reciprocally moves by the driving of the crank shaft 6. Accordingly, a noise generated in a high frequency band due to the friction and the abrasion of the connecting rod 30 and the bush 20 can be reduced also.

According to the connecting rod apparatus of the reciprocal hermetic compressor according to the present invention, the bush connected with the eccentric portion of the crank shaft and the connecting portion of the connecting rod are connected with each other by being slid. Moreover, when being connected, each of the sloping sides are closely connected with each other. Therefore, when the compressor is being operated, the noise of the high frequency caused by the friction and the abrasion due to the gap between the bush and the connecting rod can be prevented.

Furthermore, as the bush and the connecting rod are connected with each other by the connecting member having the intensity, the misalignment of the crank shaft and the piston can be compensated by the tension of the connecting member. Accordingly, the reliability of the apparatus can be improved. So far, the preferred embodiment of the present invention has been illustrated and described. However, the present invention is not limited to the preferred embodiment described here, and someone skilled in the art can modify the present invention without distorting the point of the present invention claimed in the claim part.

What is claimed is:

1. A connecting rod apparatus of a reciprocal hermetic compressor for converting a rotation to a reciprocal sliding by connecting an eccentric portion of a crank shaft and a piston, comprising:

a bush rotatably connected with the eccentric portion, and having a single first connecting portion with a pair of sloping sides at an outer circumference, the sloping sides have a predetermined slope in regard to an axis of the eccentric portion, the connecting portion configured to move in axial direction and in a direction perpendicular to the axial direction;

a connecting rod having a small inner diameter for being connected with a piston pin connected with the piston, the small inner diameter is formed at one end of the connecting rod, and a second connecting portion for being connected with the first connecting portion in a direction of the axis along the sloping sides, the second connecting portion is formed at another end of the connecting rod; and a connecting member for connecting the second connecting portion and the bush to be able to move by an external power.

2. The connecting rod apparatus of claim 1, wherein the bush comprises:

a cylindric body having a great inner diameter connected with the eccentric portion and the first connecting portion at an outer circumference; and a protrusion protruded corresponding to the first connecting portion at the outer circumference of the body and clamped by the connecting member.

3. The connecting rod apparatus of claim 1, wherein the second connecting portion comprises:

a pair of diverged portions diverged from one end of the body of the connecting rod in order to wrap the first connecting portion, and the pair of diverged portions have sloping sides corresponding to the sloping sides of the first connecting portion; and a supporting portion extended from a part between the diverged portion and the body by a predetermined thickness in order to prevent the connecting member from being separated by clamping both ends of the connecting member.

4. The connecting rod apparatus of claim 3, wherein the second connecting portion is diverged from on end of the body of the connecting rod taking a U-shape.

5. The connecting rod apparatus of claim 1, wherein the sloping sides have an angle of 3° to 5° with respect to the axis of the eccentric portion.

6. The connecting rod apparatus of claim 1, wherein the connecting member is a piano string having a predetermined thickness in order to combine the connecting portion and the bush.

7. The connecting rod apparatus of claim 2, wherein the connecting member comprises:

a clamping portion bent for a predetermined type in order to clamp the protrusion of the bush in a middle part;

a plurality of supporting portions extended symmetrically from the clamping portion in order to wrap and support the outer circumference of the bush; and an end portion extended being bent from the supporting portions in order to wrap and clamp the second connecting portion of the connecting rod, wherein the bush is prevented from being separated from the connecting portion by being supported by the piano string and can move by an elasticity of the piano string.

* * * * *